(12) United States Patent
Lahey et al.

(10) Patent No.: US 10,391,810 B2
(45) Date of Patent: Aug. 27, 2019

(54) PAGE TURNING DEVICE

(71) Applicants: Lisa D. Lahey, Round Lake, IL (US); George Lahey, Round Lake, IL (US)

(72) Inventors: Lisa D. Lahey, Round Lake, IL (US); George Lahey, Round Lake, IL (US)

(*) Notice: Subject to any disclaimer, the term of this patent is extended or adjusted under 35 U.S.C. 154(b) by 0 days.

(21) Appl. No.: 16/008,118

(22) Filed: Jun. 14, 2018

(65) Prior Publication Data
US 2018/0361782 A1 Dec. 20, 2018

Related U.S. Application Data

(60) Provisional application No. 62/520,303, filed on Jun. 15, 2017.

(51) Int. Cl.
| | |
|---|---|
| B43K 29/00 | (2006.01) |
| B42D 9/04 | (2006.01) |
| B43K 23/08 | (2006.01) |
| G06F 3/0354 | (2013.01) |

(52) U.S. Cl.
CPC .............. *B43K 29/00* (2013.01); *B42D 9/04* (2013.01); *B43K 23/08* (2013.01); *G06F 3/03545* (2013.01)

(58) Field of Classification Search
CPC .......... B43K 23/08; B43K 29/00; B42D 9/04
See application file for complete search history.

(56) References Cited

U.S. PATENT DOCUMENTS

| | | |
|---|---|---|
| 494,510 A | 3/1893 | Murphy |
| 667,950 A | 2/1901 | Oelke |
| 942,003 A | 11/1909 | Marsh |
| 1,736,480 A | 4/1927 | Deli |
| 1,844,507 A | 6/1931 | Gifford |
| 2,148,684 A | 12/1937 | Chester |
| D132,641 S | 2/1942 | Sanders |
| 2,935,354 A | 9/1957 | Chapman |
| D188,970 S | 10/1960 | Morris |
| 3,615,596 A | 10/1971 | Petti |
| 4,763,940 A | 8/1988 | Held |
| D337,611 S | 7/1993 | Peersman |
| D367,674 S | 3/1996 | Kitzmiller |
| D383,781 S | 9/1997 | Buckner |
| 5,735,544 A | 4/1998 | Buckner |
| 5,772,268 A | 6/1998 | Chabrier |

(Continued)

*Primary Examiner* — J C Jacyna
(74) *Attorney, Agent, or Firm* — Christopher J. Scott

(57) ABSTRACT

A page turning device is mountable on an end of a writing implement or similarly other shape element for enabling a user to more easily turn paper sheets. The page turning device is formed of a deformable elastic material. The elastic material is formed so as to basically provide a sheath-like female receptacle for receiving an implement end and further includes an outer sheet-engaging surface. The outer sheet-engaging surface provides gripping action at a paper sheet surface for enabling the user to turn paper sheets. The female receptacle is characterized by including an end-receiving mouth, a receptacle bottom, and a series of inwardly and radially extending rib formations. Each rib formation has an innermost edge, each of which are elastically deformable when receiving the implement end. Each rib formation directs restorative forces toward the implement end for holding the page turning device upon the implement end.

16 Claims, 15 Drawing Sheets

(56) References Cited

U.S. PATENT DOCUMENTS

| | | | | |
|---|---|---|---|---|
| 6,056,464 | A * | 5/2000 | Cohen | B43K 23/08 |
| | | | | 401/195 |
| 6,726,068 | B2 | 4/2004 | Miller | |
| 7,037,017 | B2 * | 5/2006 | Buck | B43K 29/00 |
| | | | | 401/195 |
| 7,744,137 | B2 * | 6/2010 | Mazyck | B42D 9/04 |
| | | | | 294/25 |

* cited by examiner

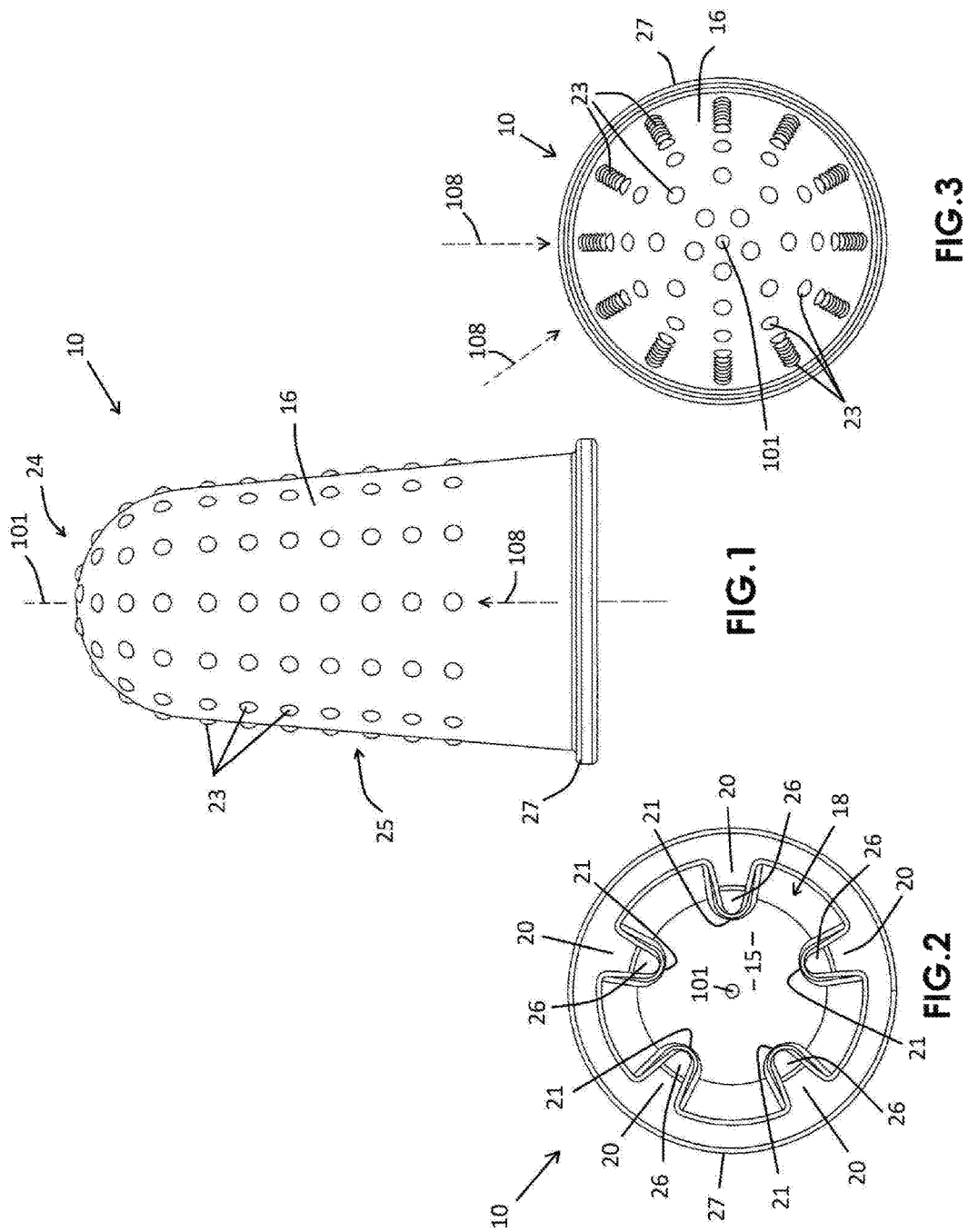

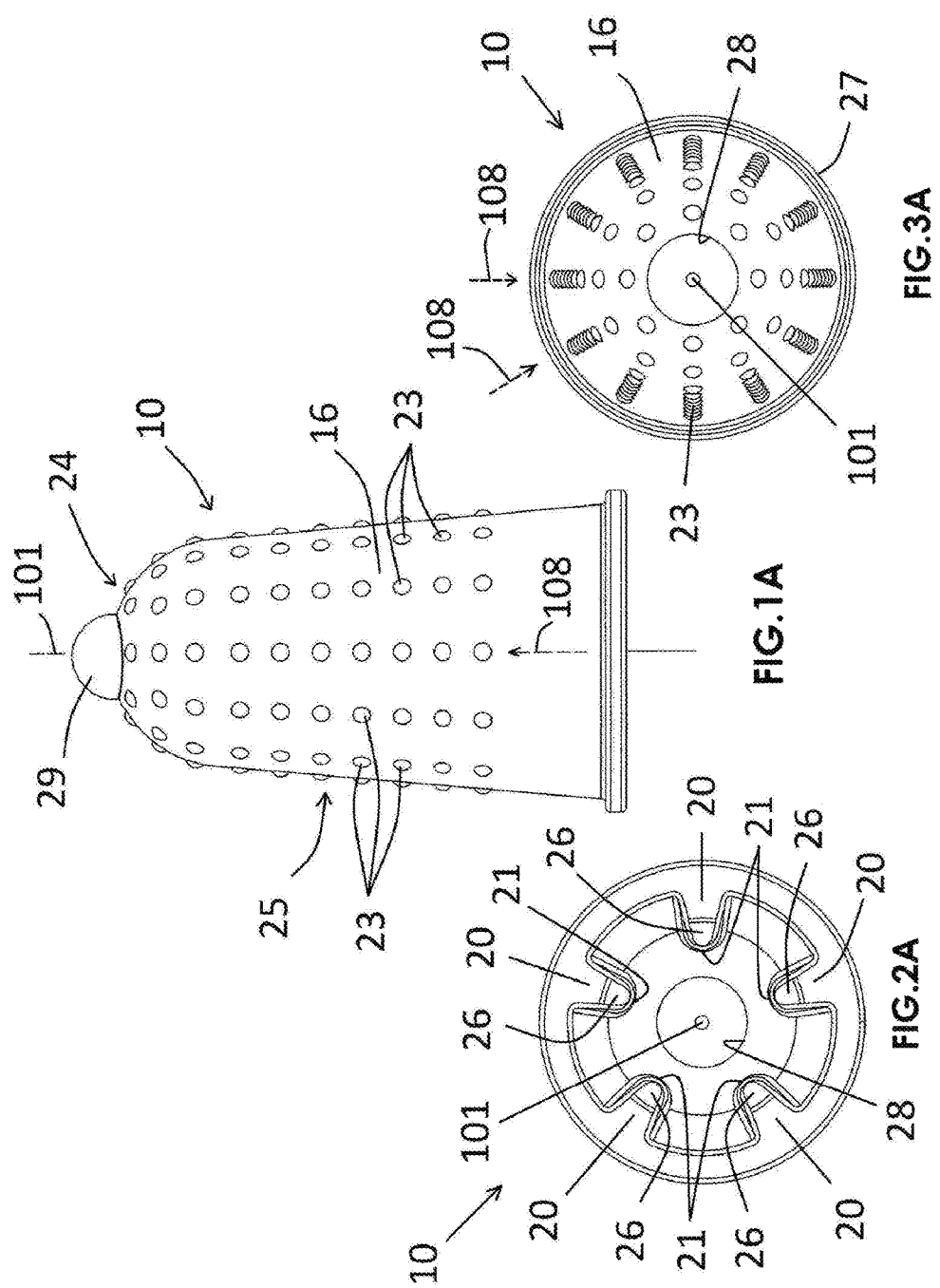

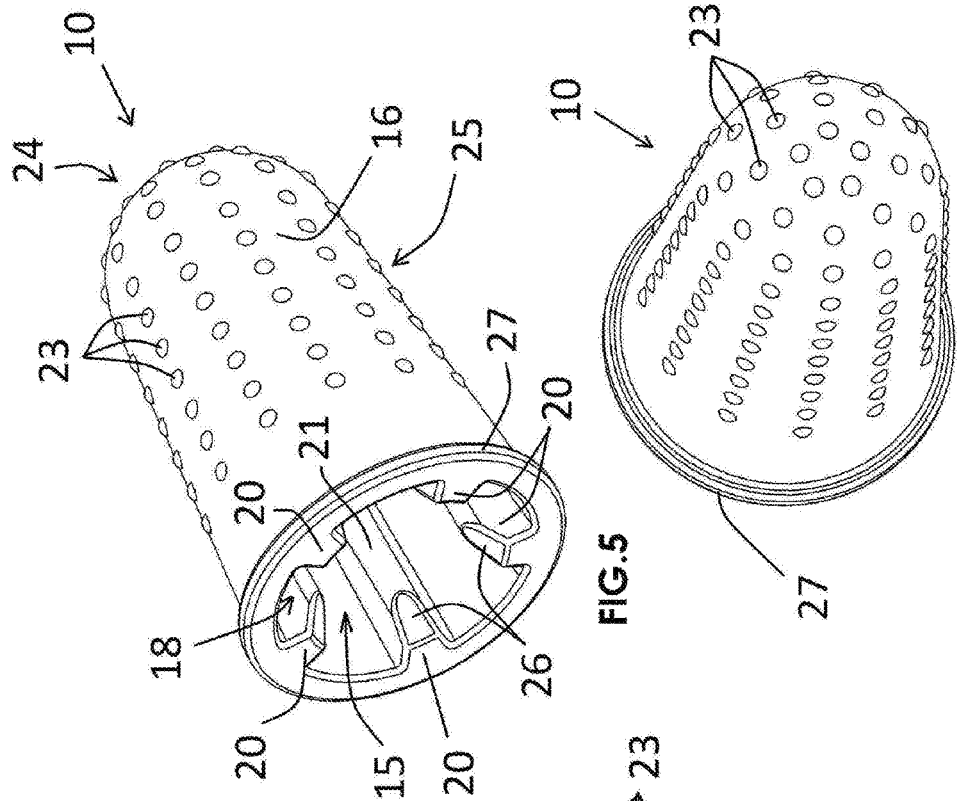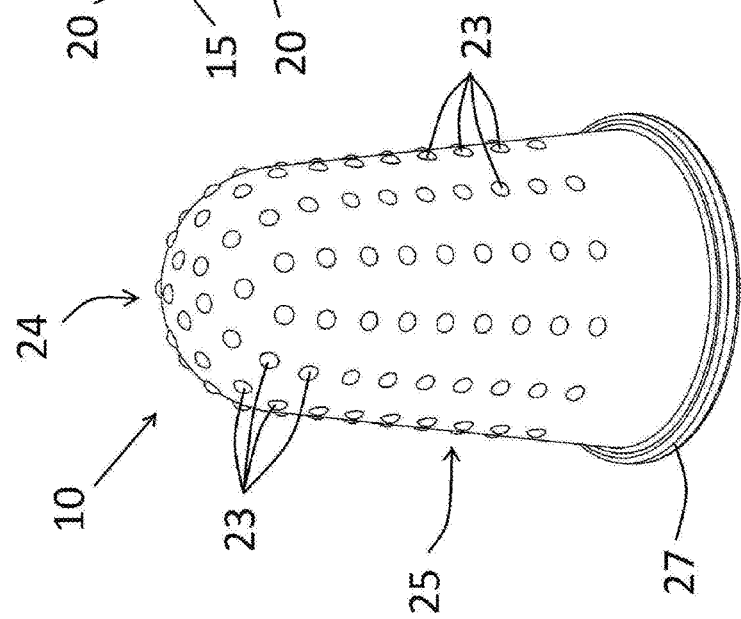

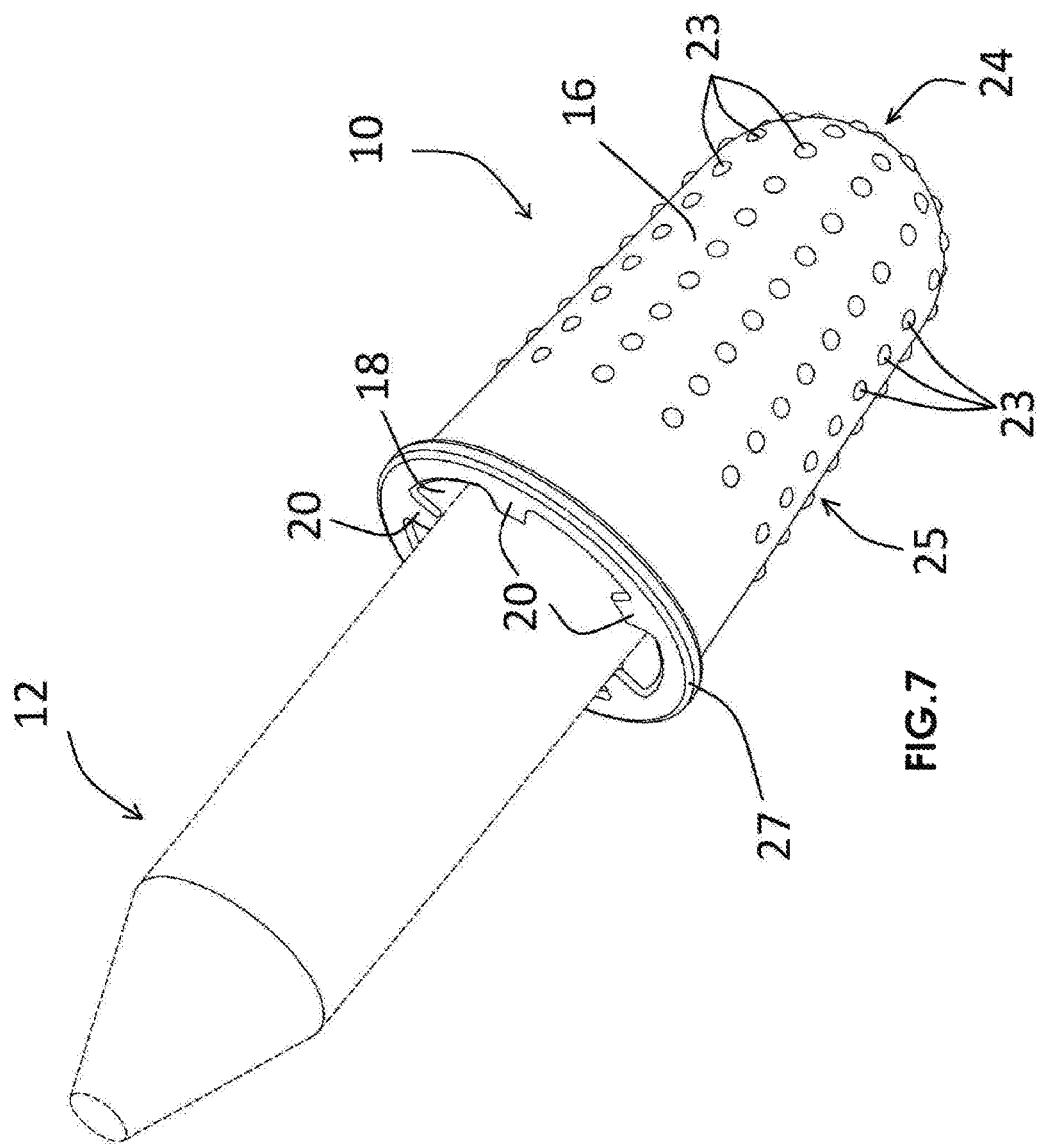

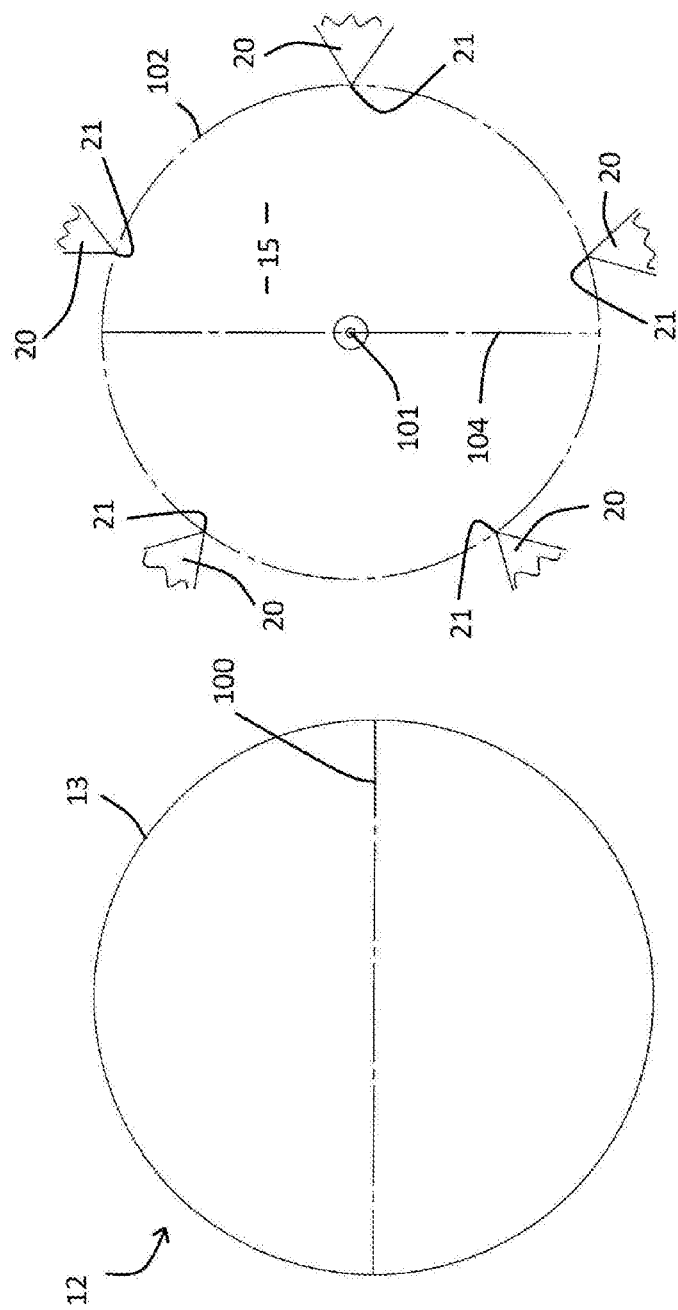

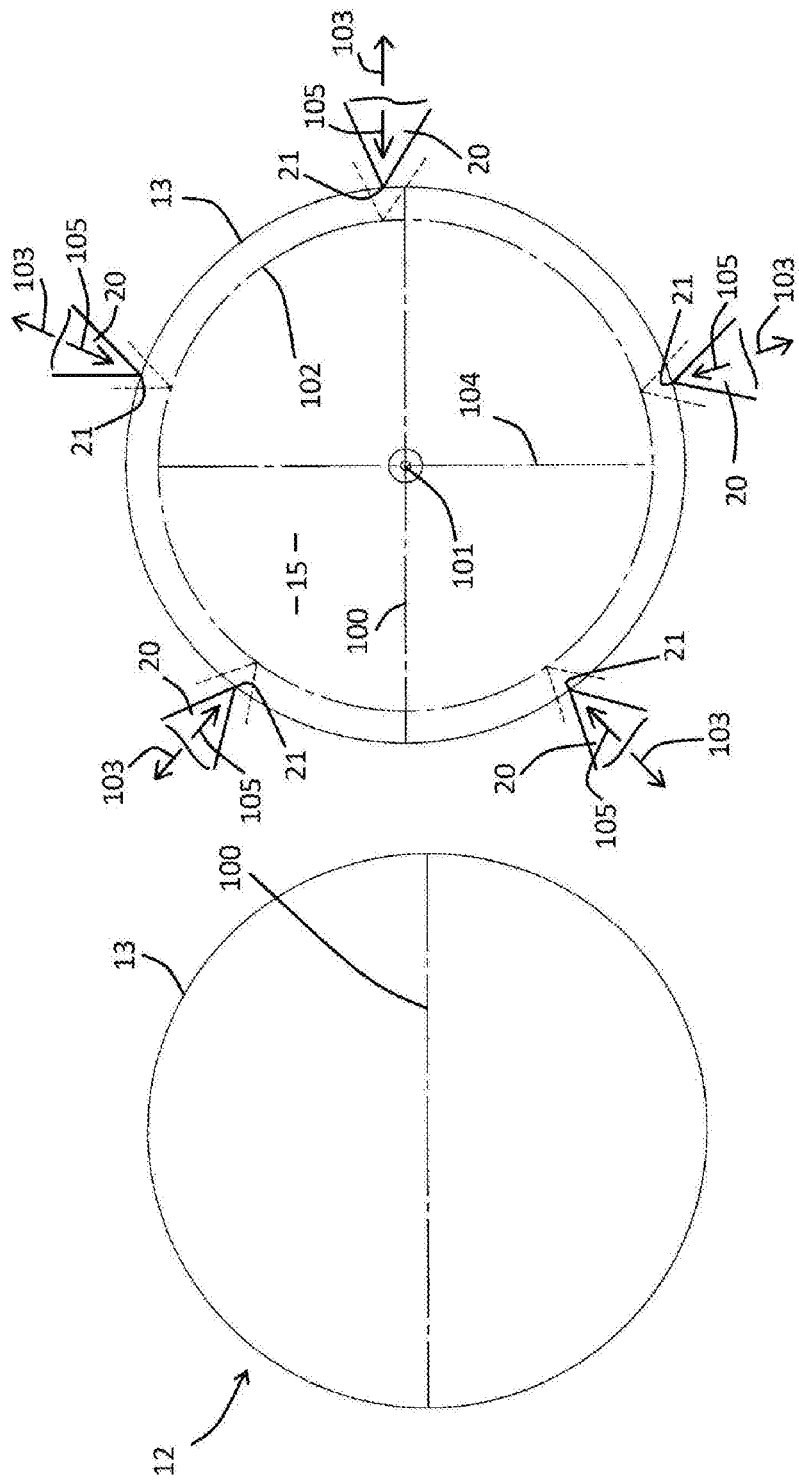

PAGE TURNING DEVICE

PRIOR HISTORY

This application claims the benefit of U.S. Provisional Patent Application No. 62/520,303 filed in the United States Patent and Trademark Office on 15 Jul. 2017.

FIELD OF THE INVENTION

The present invention generally relates to an accessory for a writing implement or similarly shaped other element. More particularly, the present invention relates to a page turning device that may be outfitted upon a writing implement such as a pen, pencil, or stylus or similarly shaped other element having a generally elongate and cylindrical form for enabling users thereof to engage and turn paper sheets via an outer sheet engaging surface of the page turning device.

BACKGROUND OF THE INVENTION

U.S. Pat. No. 494,510 ('510 patent), issued to Murphy, discloses certain Attachment for Pencils or Pens. The '510 patent describes a preferred attachment for pencils and like objects comprising a longitudinally slotted tube of flexible, springy material combined with a cylindrical casing of rubber enclosing the tube and having an eraser head at one end thereof. Other secondary or alternative embodiments are further disclosed including an embodiment having pointed projections on the slotted tube for enhancing the attachment between the tube and the cylindrical casing.

U.S. Pat. No. 4,763,940 ('940 patent), issued to Held, discloses a Document Handling Aid. The '940 patent describes a document handling aid having a resilient tubular body with first and second joined body sections. Both ends of the tubular body are open so that when mounted on a finger, the tip of the finger protrudes from the first body section adjacent thereto. The second body section grips the finger about the first knuckle and has a plurality of generally parallel longitudinal cuts therethrough to permit enhanced radial expansion of the tubular body adjacent the first knuckle of the finger.

U.S. Pat. No. 5,737,544 ('544 patent), issued to Buckner, discloses a Page-Turning Device. The '544 patent describes a page turning device that can be mounted on the end of a cylindrical writing instrument, such as a pencil. The page turning device has a substantially spherical body which has a plurality of deformable protuberances spaced about the outer surface of the body. The protuberances have an adhesive quality sufficient to grip a page of paper and are sized and spaced so that the body of the page turning device is prevented from contacting the page of paper to be turned. The page turning device has a hollow base connected to the outer surface of the body so that the page turning device can be mounted on the end of a cylindrical writing instrument. The reader may wish to also reference U.S. Design Pat. No. D383,781 with a view toward considering the ornamental aspects of the device.

U.S. Pat. No. 5,772,268 ('268 patent), issued to Chabrier, discloses a Paper Handling Aid. The '268 patent describes certain devices and aids in the process of handling paper products including page turning, paper and card sorting, paper separating, obtaining a paper coffee filter from a stack of filters and other actions requiring the separation of, moving of or obtaining of a paper or paper sheet product from among a group of such products. Additionally, the present invention will have applications, in particular for individuals with limitations in the use of fingers, hands and arms, related to the lifting of other light weight products.

U.S. Pat. No. 7,037,017 ('017 patent), issued to Buck et al., discloses a Writing Implement with Page-Turning Element. The '017 patent describes a writing implement having a first end through which a writing tip extends and a second end to which is attached a page-turning element having a multiplicity of soft, deformable protuberances to enhance its frictional grip with paper sheets. In a first embodiment, the page-turning element is configured as a conformal cap covering the second end of the barrel.

If the writing implement includes a writing tip extension and retraction mechanism operated by an actuation button in the second end of the barrel, the page turning-element overlies the button so that the button is actuated through the page-turning element by an external pressure applied thereto. A biasing element between the page-turning element and the second end of the barrel assures that the pressure needed for actuation of the button is greater than that which is normally applied through use of the page-turning element, thereby minimizing the possibility of inadvertent actuation.

U.S. Pat. No. 7,744,137 ('137 patent), issued to Mazyck, discloses a Page Turning Device for mounted placement upon a fingertip. The '137 patent describes a page turning device positionable on a fingertip of a wearer that comprises a finger sleeve of elastomeric material configured to be fitted onto the finger. A pad is affixed to the sleeve or incorporated into the sleeve, and includes a tacky outer surface configured to capture and lift a paper sheet for movement thereof.

It will thus be seen that the prior art thus perceives a need for a page or paper sheet turning device having certain resilient material construction for radially directing force into the barrel or implement end of a writing implement or similar other element for maintaining the device in an outfitted position on the writing implement. More particularly, the prior art perceives a need for a page or paper sheet turning device having a particularly constructed female receptacle provided with resilient or elastic material rib portions that, when deformed, resiliently return thereby circumferentially spaced and radially directed force into the barrel or implement end of the writing implement or similar other element for maintaining the device in an outfitted position on the writing implement as summarized in more detail hereinafter.

SUMMARY OF THE INVENTION

The present invention basically provides a page or paper sheet turning device for enabling a user to more easily turn paper sheets when outfitted upon a writing implement or similarly shaped other element. When used in combination with such a writing implement or element, the invention may be viewed as a page turning assembly. The writing implement or similarly shaped other element preferably comprises a cylindrical implement end with a cylindrical outer implement surface having a certain girth or diameter.

The page or paper sheet turning device according to the present invention preferably comprises or is constructed from an elastic material such as rubber. The elastic material construction of the page turning device is elastically deformable and has an inherent spring constant for returning deformed portions of the elastic material construction to equilibrium. The elastic material construction is preferably formed by a molding process so as to basically provide a sheath-like female receptacle having a primary longitudinal axis for receiving the implement end with an outer sheet-engaging surface.

The outer sheet-engaging surface provides a gripping action by way of frictional engagement between the elastic material construction and the paper sheet surface for enabling the user to turn the paper sheet by frictionally engaging the sheet at the point of contact and thereby aiding in the movement of the page. The female receptacle portion of the page turning device is characterized by comprising an end-receiving mouth, a receptacle bottom (or top), and a series of inwardly and radially extending spoke-like rib formations extending intermediate the end-receiving mouth and the receptacle bottom.

Each rib formation comprises a radially innermost edge such that an imaginary circle may be made tangent to each edge. The innermost edges are elastically deformable radially outwardly when receiving the writing implement end. In other words, the implement end comprises a cylindrical outer implement surface having a certain diameter greater in dimension compared to said imaginary circle.

The outer implement surface elastically deforms the innermost edges radially outwardly when inserted into the female receptacle, and each rib formation resiliently directs restorative forces toward the outer implement surface for holding the page turning device upon the implement end. The writing implement and page turning device together enable the user to engage and turn paper sheets via the outer sheet-engaging surface.

The outer sheet-engaging surface preferably comprises a series of outwardly extending protuberances or bump formations. The outwardly extending protuberances or bump formations provide enhanced gripping action when engaging paper sheet surfaces for enhancing the user's ability to grip and turn paper sheets. The outer sheet-engaging surface further preferably comprises a tip portion and a barrel portion.

The tip portion is preferably hemispherical and the barrel portion is preferably frustoconical such that the outer sheet-engaging surface extends obliquely relative to the plane of the receptacle mouth. The outwardly extending protuberances or bump formations at the barrel portion are preferably linearly aligned as they extend from the tip portion toward the receptacle mouth.

The innermost edges preferably extend orthogonally relative to the receptacle mouth plane in parallel relation to the axis of the page turning device. Each rib formation preferably comprises an oblique portion adjacent the receptacle mouth such that each (planar) oblique portion extends in an oblique angle relative to the receptacle mouth plane and the inner most edges for structurally guiding the outer implement surface into the female receptacle when said surface is being inserted thereinto.

The page turning device further preferably comprises a flange portion extending outwardly at the receptacle mouth. The flange portion is designed to enhance the user's ability to grip the page turning device at the receptacle mouth and thus mount the page turning device upon the implement end. The tip portion/receptacle bottom may be optionally outfitted with an end-letting aperture for enabling the user to expose the implement end for enabling implement end functionality. In this regard, it is contemplated that the writing implement may be preferably defined as a stylus with the implement end being a stylus tip. The end-letting aperture thus enables the user to expose the stylus tip for enabling stylus tip functionality.

BRIEF DESCRIPTIONS OF THE DRAWINGS

Other features of the invention will become more evident from a consideration of the following brief descriptions of the illustrations submitted in support of the subject invention:

FIG. 1 is a side elevational view of a preferred embodiment of the Page Turning Device according to the present invention;

FIG. 1A is a side elevational view of an alternative embodiment of the Page Turning Device according to the present invention;

FIG. 2 is a bottom plan view of the preferred embodiment of the Page Turning Device according to the present invention;

FIG. 2A is a bottom plan view of the alternative embodiment of the Page Turning Device according to the present invention;

FIG. 3 is a top plan view of the preferred embodiment of the Page Turning Device according to the present invention;

FIG. 3A is a top plan view of the alternative embodiment of the Page Turning Device according to the present invention;

FIG. 4 is a first top perspective view of the preferred embodiment of the Page Turning Device;

FIG. 5 is a first bottom perspective view of the preferred embodiment of the Page Turning Device;

FIG. 6 is a second top perspective view of the preferred embodiment of the Page Turning Device;

FIG. 7 is a second bottom perspective view of the preferred embodiment of the Page Turning Device outfitted upon a generic writing implement;

FIG. 15 is a diagrammatic depiction of a transverse section of a cylindrical implement end to show an outer cylindrical surface thereof with a given diameter;

FIG. 16 is a diagrammatic depiction of an imaginary circle or tangent circle defined by innermost edges of a series of rib formation features of the Page Turning Device(s) when in a relaxed state or configuration;

FIG. 19 is a re-presentation of the diagrammatic depiction otherwise shown in FIGS. 15 and 17, re-presented for ease of comparison in side-by-side relation to the diagrammatic depiction presented in FIG. 20.

FIG. 20 is a diagrammatic depiction of the imaginary circle or tangent circle defined by innermost edges of a series of rib formation features of the Page Turning Device(s) when in a relaxed state or configuration and a solid outer cylindrical surface of the implement end inserted into the Page Turning Device to depict the actuated state or configuration of the innermost edges of the rib formations when engaging the outer cylindrical surface.

Figure 21:
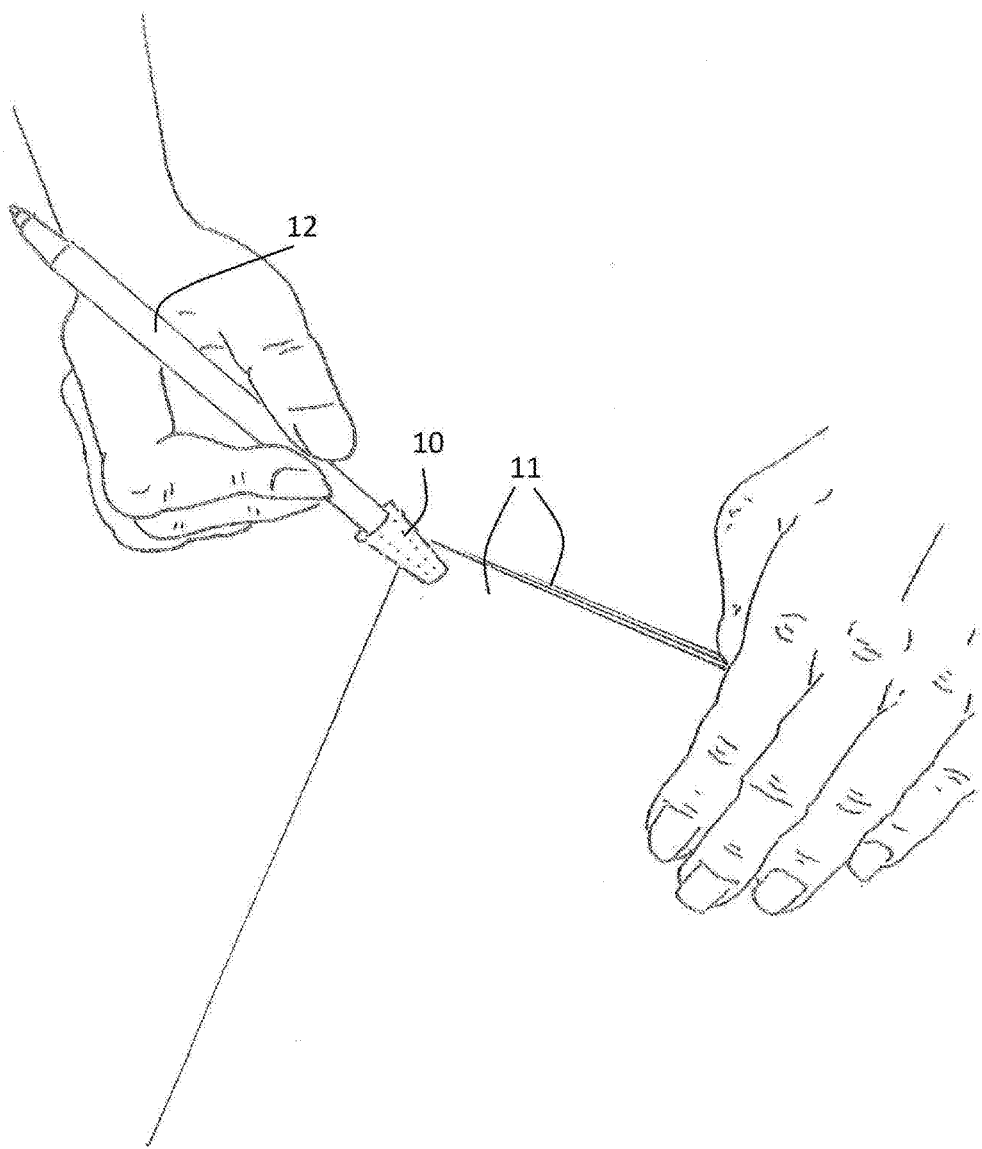

FIG. 21 is a first sequential depiction of a user utilizing the Page Turning Device according to the present invention to engage an upper surface of a first paper sheet or page before turning the first paper sheet or page.

Figure 22:
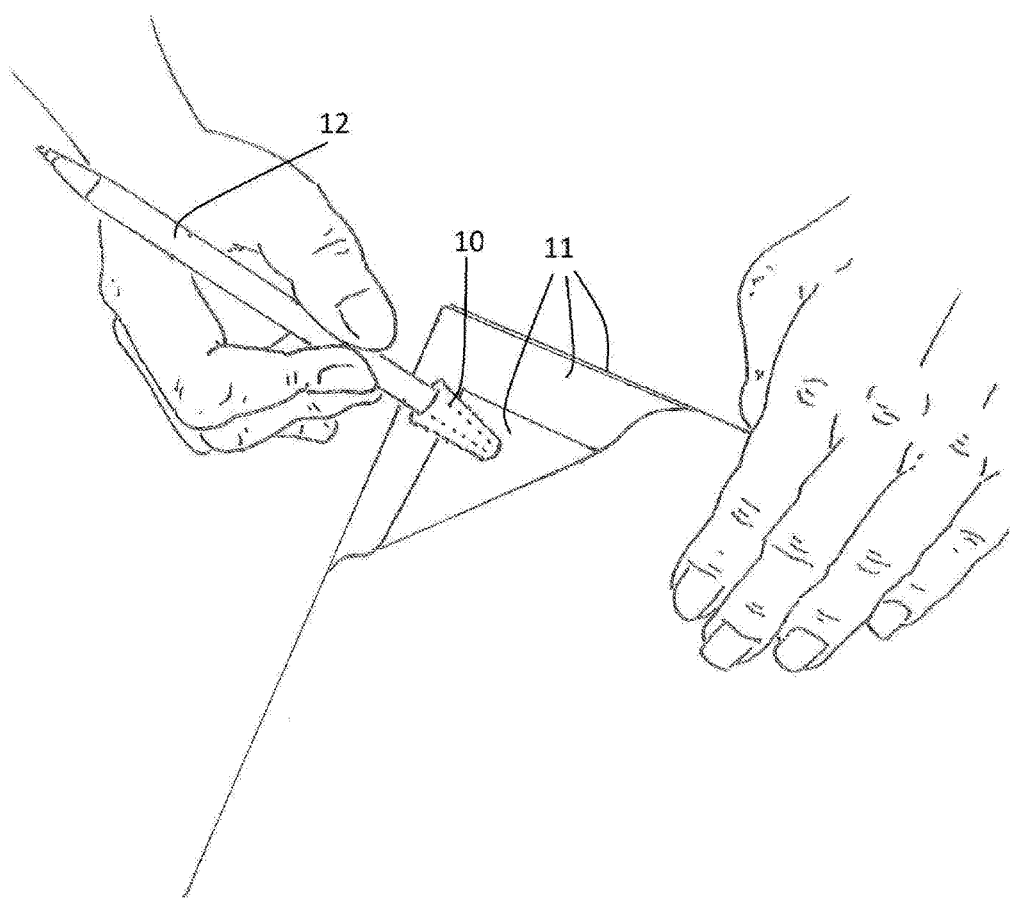

FIG. 22 is a second sequential depiction of the user utilizing the Page Turning Device according to the present invention to turn the first paper sheet or page.

Figure 23:
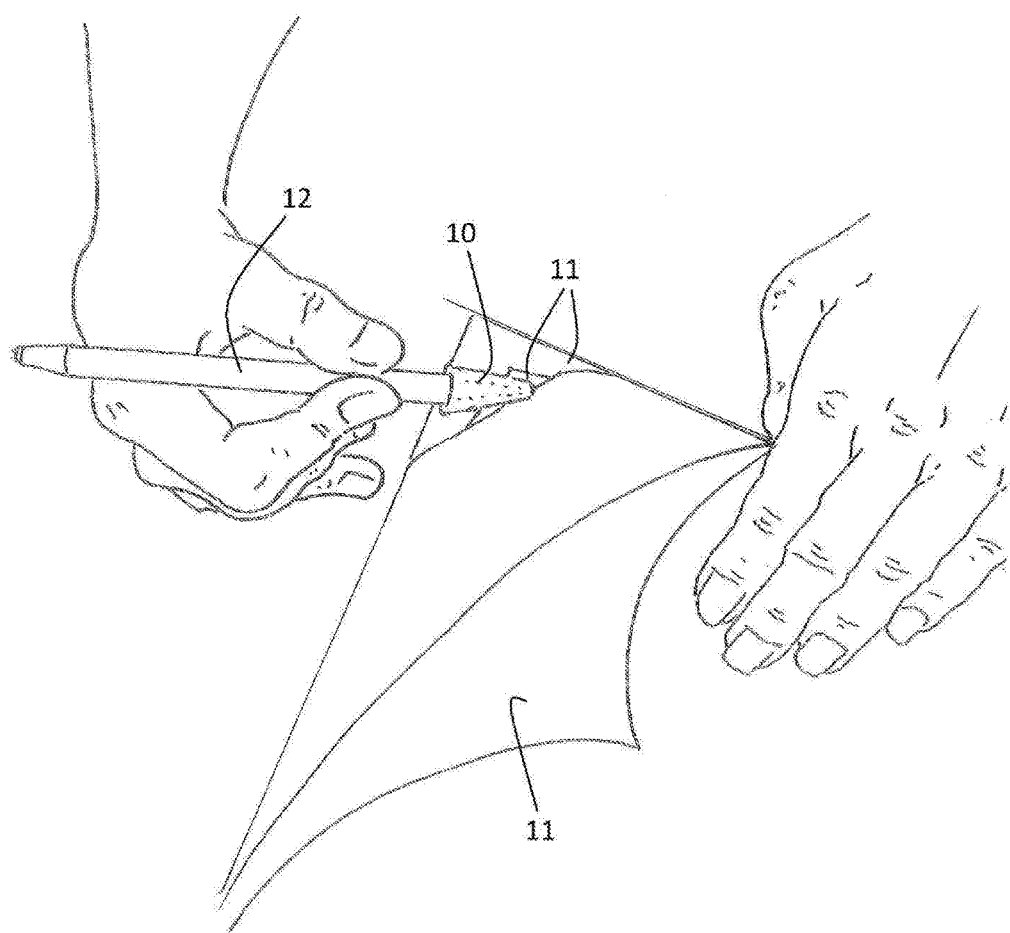

FIG. 23 is a third sequential depiction of the user utilizing the Page Turning Device according to the present invention to turn a second paper sheet or page.

DETAILED DESCRIPTION OF THE PREFERRED EMBODIMENTS

Referring now to the drawings with more specificity, the present invention preferably provides a page or paper sheet turning device 10 for enabling a user to more easily turn pages or paper sheets 11 when outfitted upon a writing implement or similarly shaped other element as generically depicted and referenced at 12. When used in combination with such a writing implement or element 12, the present invention may be viewed as a page turning assembly. The writing implement or similarly shaped other element 12 preferably comprises a cylindrical implement end 14 with a cylindrical outer implement surface 13 having a certain girth or basic diameter as at 100.

The page or paper sheet turning device 10 according to the present invention preferably comprises or is constructed from an elastic material such as rubber. The elastic material construction of the page turning device 10 is elastically deformable and has an inherent spring constant for returning deformed portions of the elastic material construction to equilibrium. The elastic material construction is preferably formed by a molding process so as to basically provide a sheath-like article having a female receptacle as at 15 having a primary longitudinal axis 101 for receiving the implement end 14 and further comprises an outer sheet-engaging surface as at 16.

The outer sheet-engaging surface 16 provides a gripping action by way of frictional engagement between the elastic material construction and the paper sheet surface 17 for enabling the user to turn the paper sheet 11 by frictionally engaging the paper sheet 11 at the point(s) of contact thereby aiding in the movement of the page or paper sheet 11. The female receptacle portion 15 of the page turning device 10 is characterized by comprising an end-receiving mouth 18, a receptacle bottom 19 (or top depending on orientation), and a series of inwardly and radially extending spoke-like rib formations 20 extending intermediate the end-receiving mouth 18 and the receptacle bottom 19. In the preferred and alternative embodiments there are five equally and circumferentially spaced rib formations 20.

Figure 8:
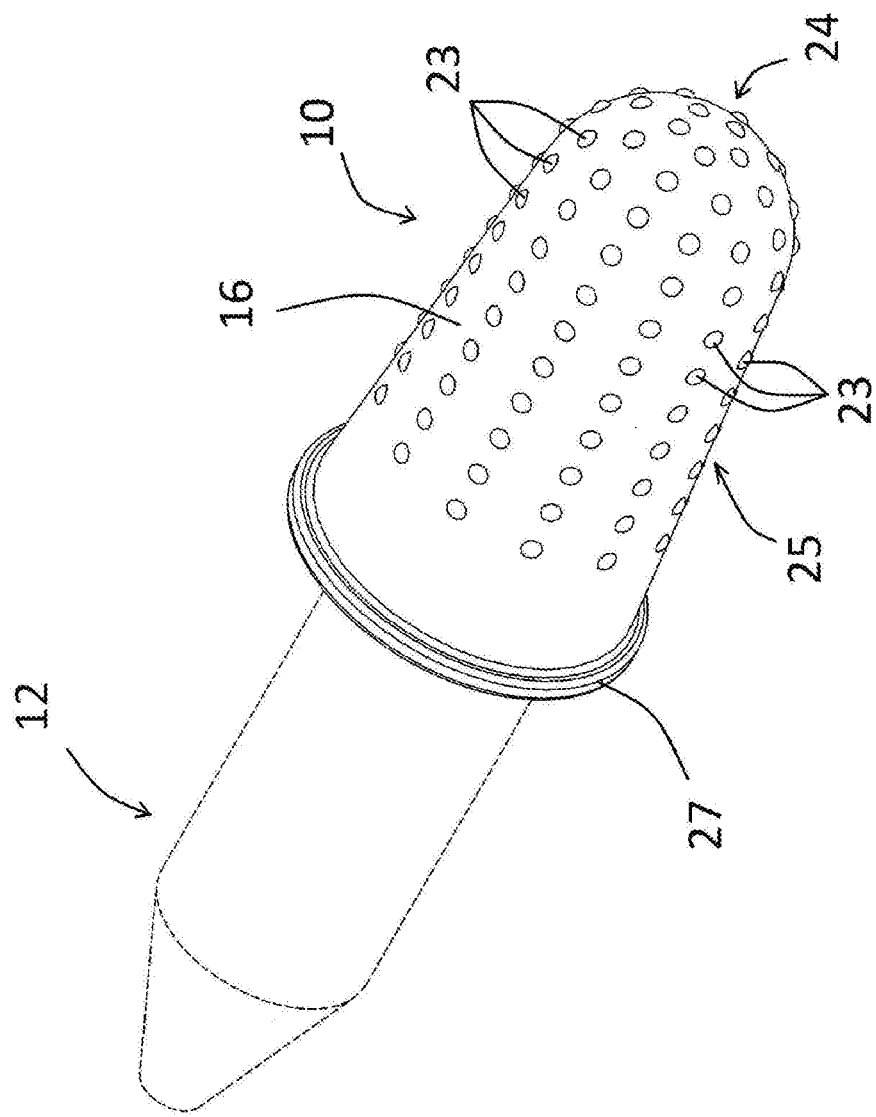
FIG. 8 is a third top perspective view of the preferred embodiment of the Page Turning Device outfitted upon the generic writing implement.
Figures 9, 10:
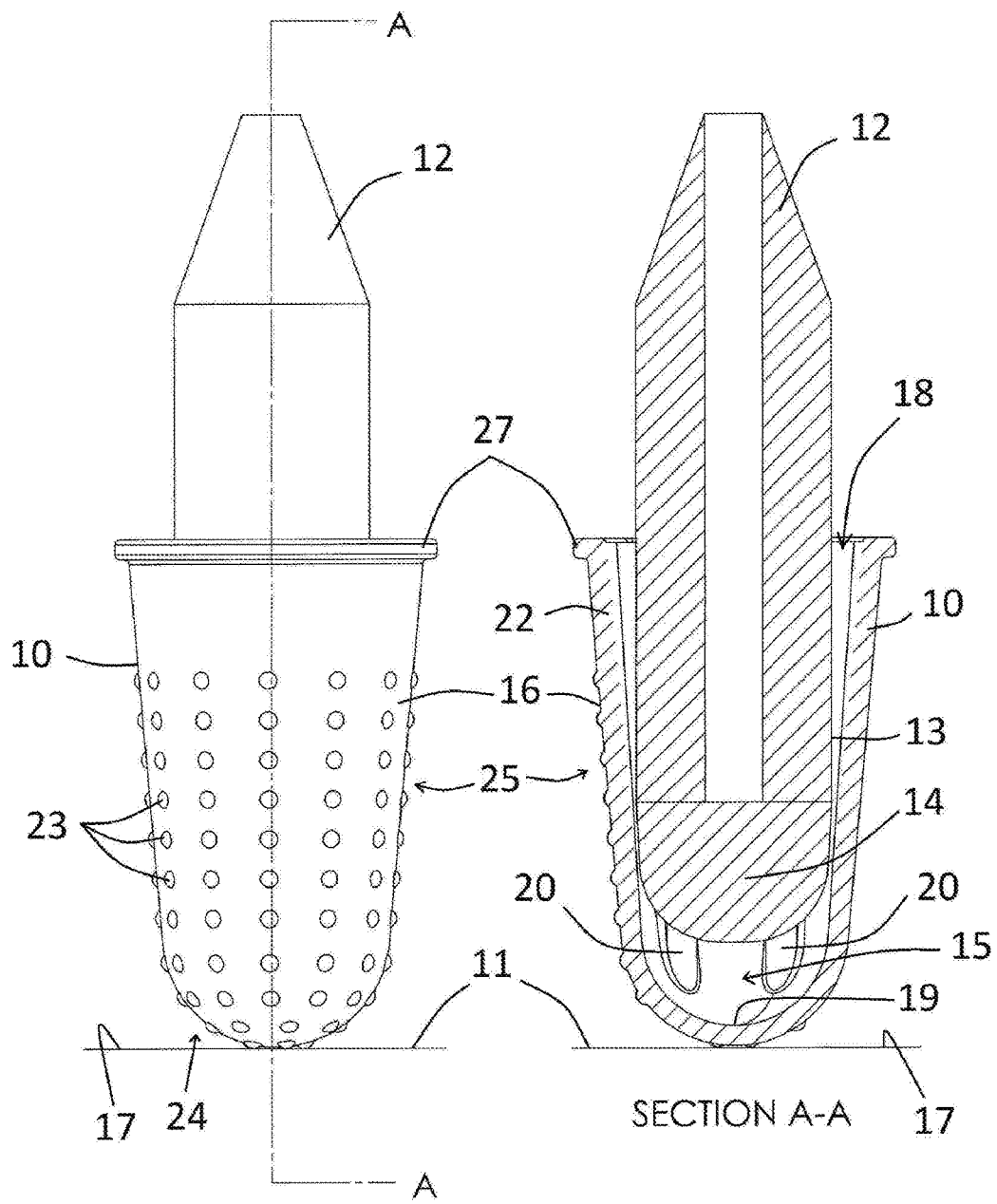
FIG. 9 is a first side elevational view of the preferred embodiment of the Page Turning Device outfitted upon the generic writing implement.
FIG. 10 is a longitudinal cross-sectional view of the preferred embodiment of the Page Turning Device outfitted upon the generic writing implement as sectioned from FIG. 9.
Figure 11:
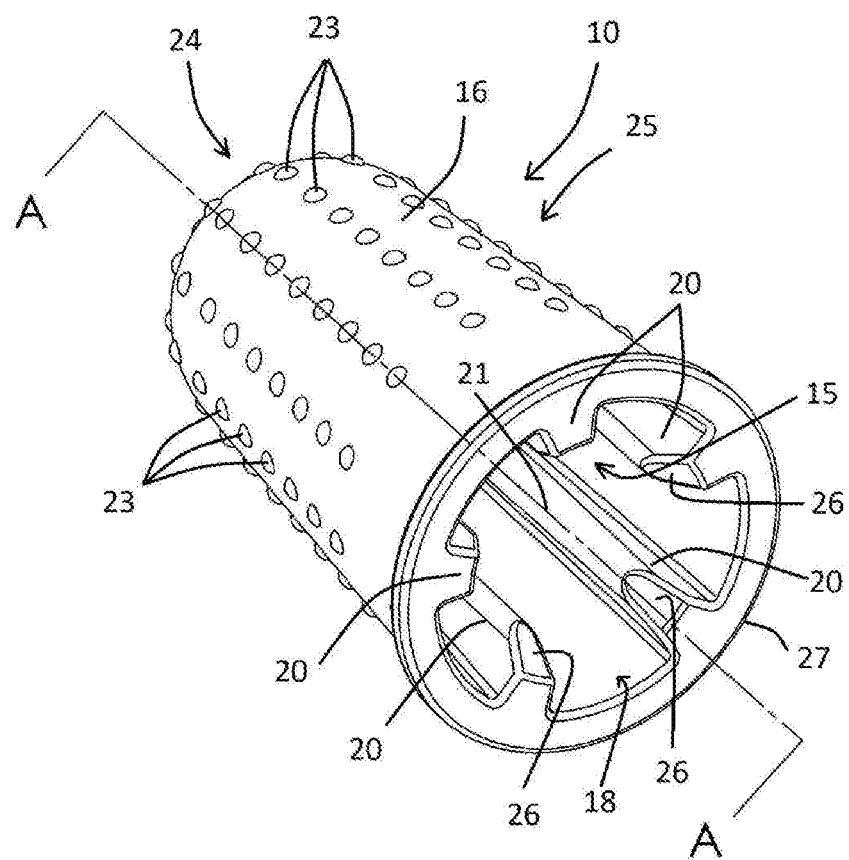
FIG. 11 is a second bottom perspective view of the preferred embodiment of the Page Turning Device.
Figure 12:
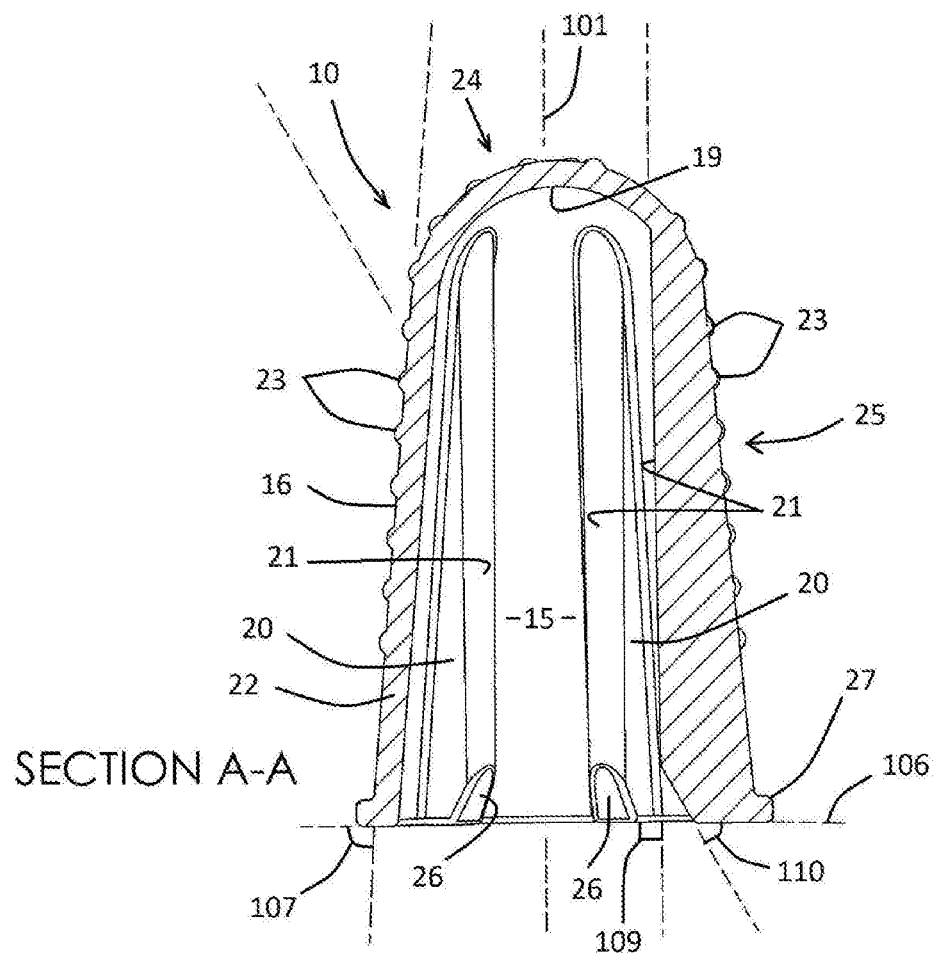
FIG. 12 is a longitudinal cross-sectional view of the preferred embodiment of the Page Turning Device as sectioned from FIG. 11.
Figures 13, 14:
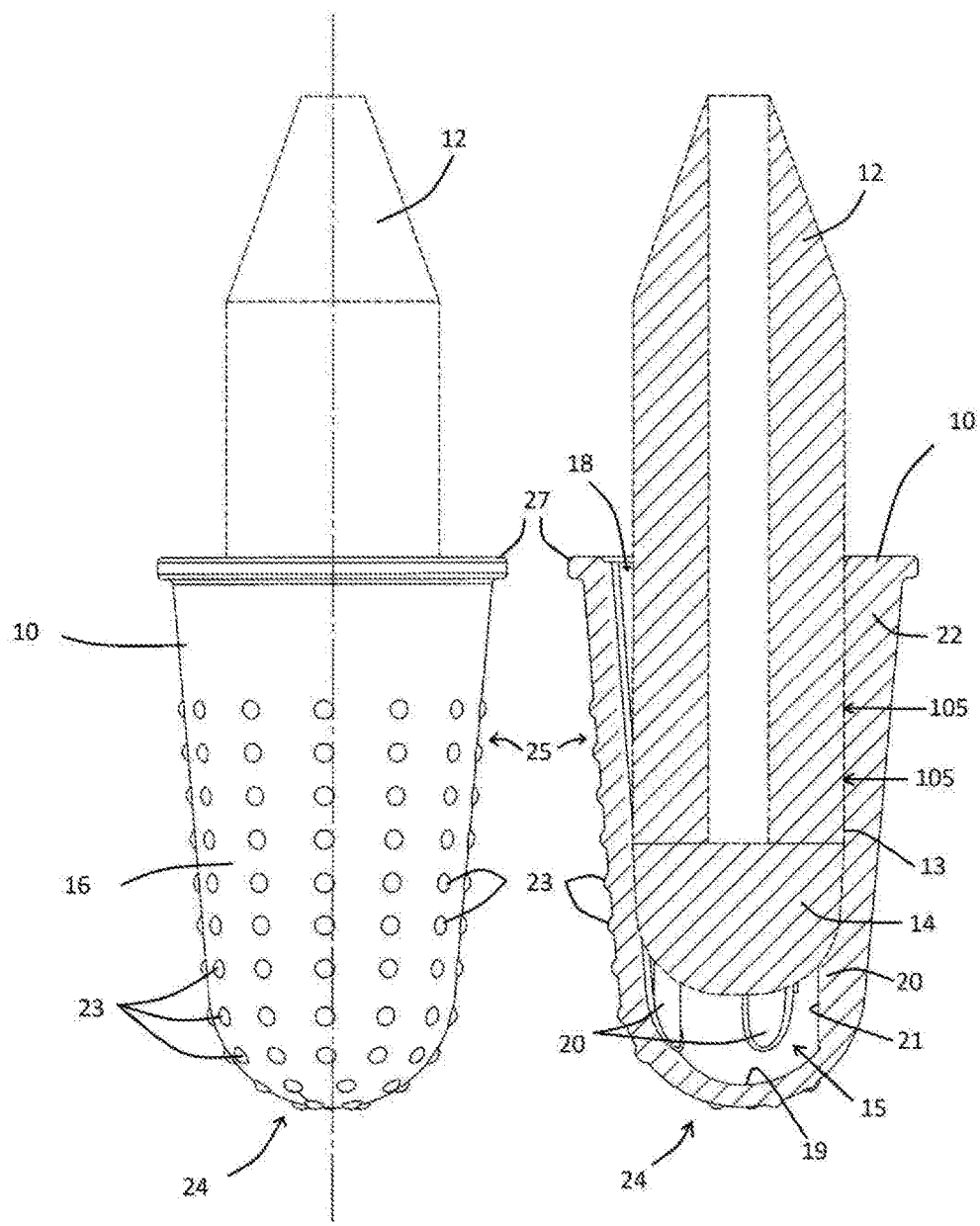
FIG. 13 is a second side elevational view of the preferred embodiment of the Page Turning Device outfitted upon the generic writing implement.
FIG. 14 is a longitudinal cross-sectional view of the preferred embodiment of the Page Turning Device outfitted upon the generic writing implement as sectioned from FIG. 13 through a rib formation.
Figure 18:
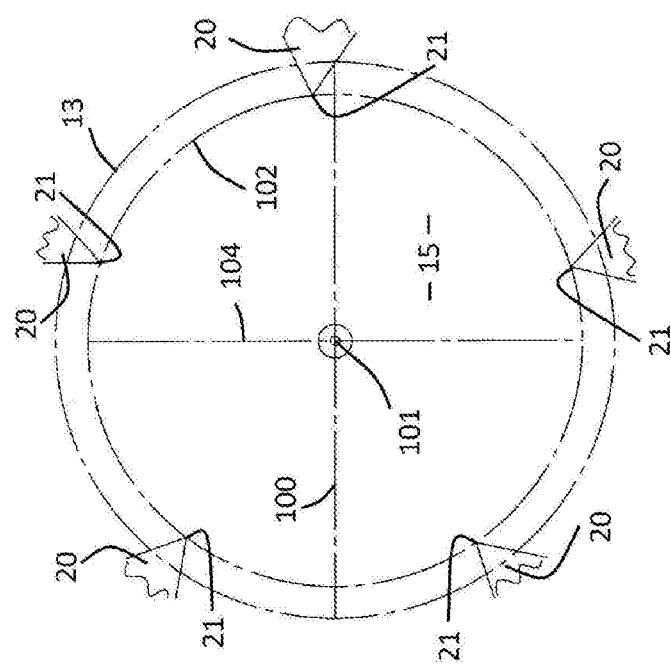
FIG. 18 is a diagrammatic depiction of the imaginary circle or tangent circle defined by innermost edges of a series of rib formation features of the Page Turning Device(s) when in a relaxed state or configuration superimposed upon a phantom outer cylindrical surface of an implement end to show the relative difference in diameters therebetween.
Figure 17:
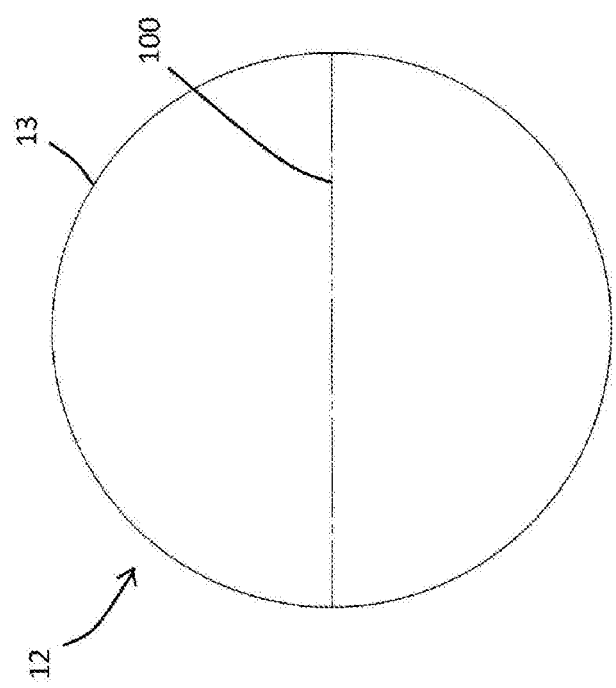
FIG. 17 is a re-presentation of the diagrammatic depiction otherwise shown in FIG. 15, re-presented for ease of comparison in side-by-side relation to the diagrammatic depiction presented in FIG. 18.

Each rib formation 20 preferably comprises a radially innermost edge 21 such that an imaginary circle or circular tangent 102 may be made tangent to each innermost edge 21 as generally depicted and referenced in FIGS. 16, 18, and 20. The innermost edges 21 and supporting elastic material construction 22 are elastically deformable radially outwardly as at arrows 103 when receiving the writing implement end 14. In other words, the implement end 14 comprises a cylindrical outer implement surface 13 having a certain diameter 100 greater in dimension compared to the diameter 104 of the imaginary circle or circular tangent 102 as further diagrammatically and comparatively depicted and referenced in FIGS. 16, 18, and 20.

In other words, the outer implement surface 13 elastically deforms the innermost edges 21 and surrounding elastic material construction 22 radially outwardly when inserted into the female receptacle 15, and each rib formation 21 resiliently directs restorative forces depicted at arrows 105 toward the outer implement surface 13 for holding the page turning device 10 upon the implement end 14. The writing implement or similar other element 12 and page turning device 10 together enable the user to engage and turn paper sheets 11 via the outer sheet-engaging surface 16.

The outer sheet-engaging surface 16 preferably comprises a series of outwardly extending protuberances or bump formations as at 23. The outwardly extending protuberances or bump formations 23 provide enhanced gripping action when engaging paper sheet surfaces 17 for enhancing the user's ability to grip and turn paper sheets 11. The outer sheet-engaging surface 16 further preferably comprises a tip portion as at 24 and a barrel portion as at 25.

The tip portion 24 is preferably hemispherical in geometry and the barrel portion 25 is preferably frustoconical in geometry such that the outer sheet-engaging surface 16 extends obliquely relative to the plane 106 of the receptacle mouth 18 as at oblique angle 107. The outwardly extending protuberances or bump formations 23 at the barrel portion 25 are preferably linearly aligned as at arrows 108 as they extend from the tip portion 24 toward the receptacle mouth 18.

The innermost edges 21 preferably extend orthogonally relative to the receptacle mouth plane 106 in parallel relation to the primary longitudinal axis 101 of the page turning device 10 as at right angle 109. Each rib formation 20 further preferably comprises an oblique portion 26 adjacent the receptacle mouth 18 such that each (planar) oblique portion 26 extends in an oblique angle 110 relative to the receptacle mouth plane 106 and the inner most edges 21 for structurally guiding the outer implement surface 13 into the female receptacle 15 when said surface 13 is being inserted thereinto. Each oblique angle 110 is selected from an oblique angle range ranging between 55 and 65 degrees from the receptacle mouth plane 106 with a preferred oblique angle of about 60 degrees.

Other optional features of the page turning device 10 according to the present invention further include a flange portion 27 extending outwardly at the receptacle mouth 18. The flange portion 27 is designed to enhance the user's ability to grip the page turning device 10 at the receptacle mouth 18 and thereby mount the page turning device 10 upon the implement end 14. In an alternative embodiment, the tip portion 24/receptacle bottom 19 optionally features an end-letting aperture 28 for enabling the user to expose the implement end 14 for enabling implement end functionality. In this regard, it is contemplated that the writing implement 12 may be preferably defined as a stylus with the implement end being a stylus tip as at 29. The end-letting aperture 28 thus enables the user to expose the stylus tip 29 for enabling stylus tip functionality as generally and comparatively depicted in FIGS. 1A-3A.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A page turning assembly for enabling a user to more easily turn paper sheets, the page turning assembly comprising, in combination:
a writing implement, the writing implement comprising an implement end; and
a page turning device, the page turning device being formed from an elastic material, the elastic material being elastically deformable and having an inherent spring constant for returning deformed portions of the elastic material to equilibrium, the elastic material being formed so as to provide a female receptacle for receiving the implement end and an outer sheet-engaging surface, the outer sheet-engaging surface for providing gripping action at a paper surface for enabling the user to turn the paper sheet, the female receptacle being characterized by comprising a receptacle mouth, a receptacle bottom, and a series of inwardly and radially extending rib formations extending intermediate the receptacle mouth and the receptacle bottom, the receptacle mouth extending in a receptacle mouth plane, each rib formation comprising an innermost edge and an oblique portion adjacent the receptacle mouth, the innermost edges extending orthogonally relative to the receptacle mouth plane and being elastically deformable radially outwardly when receiving the implement end, each oblique portion extending in an oblique angle relative to the receptacle mouth plane and the innermost edges for guiding the implement end into the female receptacle when being inserted thereinto, the implement end comprising an outer implement surface, the outer implement surface for elastically deforming the innermost edges radially outwardly when inserted into the female receptacle, each rib formation for directing restorative forces toward the outer implement surface for holding the page turning device upon the implement end, the writing implement and page turning device together thus enabling the user to engage and turn paper sheets via the outer sheet engaging surface.

2. The page turning assembly of claim 1 wherein the outer sheet-engaging surface comprises a series of outwardly extending protuberances, the outwardly extending protuberances for providing enhanced gripping action when engaging paper sheet surfaces for enhancing the user's ability to grip and turn paper sheets.

3. The page turning device of claim 2 wherein the outer sheet-engaging surface comprises a tip portion and a barrel portion, the tip portion being hemispherical and the barrel portion being frustoconical.

4. The page turning assembly of claim 3 wherein the outwardly extending protuberances at the barrel portion are linearly aligned extending from the tip portion toward the receptacle mouth.

5. The page turning assembly of claim 1 wherein each oblique angle is selected from an oblique angle range, the oblique angle range being between 55 and 65 degrees from the receptacle mouth plane.

6. The page turning assembly of claim 1 comprising a flange portion extending outwardly at the receptacle mouth, the flange portion for enhancing the user's ability to grip the page turning device at the receptacle mouth and thus mount the page turning device upon the implement end.

7. The page turning assembly of claim 3 wherein the tip portion and receptacle bottom comprise an end-letting aperture, the end-letting aperture for enabling the user to expose the implement end for enabling implement end functionality.

8. The page turning assembly of claim 7 wherein the writing implement is a stylus and the implement end is a stylus tip, the end-letting aperture thus for enabling the user to expose the stylus tip for enabling stylus tip functionality.

9. A page turning device mountable on an implement end for enabling a user to more easily turn paper sheets, the page turning device being formed from an elastic material, the elastic material being elastically deformable and having an inherent spring constant for returning deformed portions of the elastic material to equilibrium, the elastic material being formed so as to provide a female receptacle for receiving the implement end and comprising an outer sheet-engaging surface, the outer sheet-engaging surface for providing gripping action at a paper sheet surface for enabling the user to turn paper sheets, the female receptacle being characterized by comprising a receptacle mouth, a receptacle bottom, and a series of inwardly and radially extending rib formations extending intermediate the receptacle mouth and the receptacle bottom, the receptacle mouth extending in a receptacle mouth plane, each rib formation comprising an innermost edge and an oblique portion adjacent the receptacle mouth, the innermost edges extending orthogonally relative to the receptacle mouth plane and being elastically deformable radially outwardly when receiving the implement end, each oblique portion extending in an oblique angle relative to the receptacle mouth plane and the innermost edges for guiding the implement end into the female receptacle when being inserted thereinto, the implement end comprising an outer implement surface, the outer implement surface for elastically deforming the innermost edges radially outwardly when inserted into the female receptacle, each rib formation for directing restorative forces toward the outer implement surface for holding the page turning device upon the implement end, the page turning device thus enabling the user to engage and turn paper sheets via the outer sheet engaging surface.

10. The page turning device of claim 9 wherein the outer sheet-engaging surface comprises a series of outwardly extending protuberances, the outwardly extending protuberances providing enhanced gripping action when engaging paper sheet surfaces for enhancing the user's ability to grip and turn paper sheets.

11. The page turning device of claim 10 wherein the outer sheet-engaging surface comprises a tip portion and a barrel portion, the tip portion being hemispherical and the barrel portion being frustoconical.

12. The page turning device of claim 11 wherein the outwardly extending protuberances at the barrel portion are linearly aligned extending from the tip portion toward the receptacle mouth.

13. The page turning device of claim 9 wherein each oblique angle is selected from an oblique angle range, the oblique angle range being between 55 and 65 degrees from the receptacle mouth plane.

14. The page turning device of claim 9 comprising a flange portion extending outwardly at the receptacle mouth, the flange portion for enhancing the user's ability to grip the page turning device at the receptacle mouth and thus mount the page turning device upon the implement end.

15. The page turning device of claim 11 wherein the tip portion and receptacle bottom comprise an end-letting aperture, the end-letting aperture for enabling the user to expose the implement end for enabling implement end functionality.

16. The page turning device of claim 15 wherein the implement end is a stylus tip, the end-letting aperture thus for enabling the user to expose the stylus tip for enabling stylus tip functionality.

\* \* \* \* \*